United States Patent
Hicok et al.

(10) Patent No.: US 6,266,753 B1
(45) Date of Patent: *Jul. 24, 2001

(54) MEMORY MANAGER FOR MULTI-MEDIA APPARATUS AND METHOD THEREFOR

(75) Inventors: Gary D. Hicok; Jeffery M. Michelsen, both of Mesa, AZ (US)

(73) Assignee: Cirrus Logic, Inc., Fremont, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/890,825

(22) Filed: Jul. 10, 1997

(51) Int. Cl.[7] ................................................. G06F 12/02
(52) U.S. Cl. .............................. 711/202; 711/3; 711/101; 711/118; 711/206; 345/202; 345/509; 707/101; 708/203; 704/500
(58) Field of Search ................................ 711/2, 202–207, 711/101–105, 3, 118; 345/501–516, 202; 364/715.02; 707/101; 708/203; 704/500

(56) References Cited

U.S. PATENT DOCUMENTS

| | | | |
|---|---|---|---|
| 4,583,185 | 4/1986 | Heartz ................................ | 345/421 |
| 4,586,038 | 4/1986 | Sims et al. ......................... | 345/430 |
| 4,692,880 | 9/1987 | Merz et al. ........................ | 345/430 |
| 4,714,428 | 12/1987 | Bunker et al. ..................... | 434/43 |
| 4,715,005 | 12/1987 | Heartz ................................ | 345/421 |
| 4,727,365 | 2/1988 | Bunker et al. ..................... | 345/139 |
| 4,811,245 | 3/1989 | Bunker et al. ..................... | 345/429 |
| 4,821,212 | 4/1989 | Heartz ................................ | 345/426 |
| 4,825,391 | 4/1989 | Merz .................................. | 345/431 |
| 4,855,937 | 8/1989 | Heartz ................................ | 345/421 |
| 4,862,388 | 8/1989 | Bunker ............................... | 345/427 |
| 4,876,651 | * 10/1989 | Dawson ............................. | 345/516 |
| 4,905,164 | 2/1990 | Chandler et al. .................. | 345/431 |
| 4,958,305 | 9/1990 | Piazza ................................ | 345/427 |
| 4,965,745 | 10/1990 | Economy et al. ................. | 345/431 |
| 4,974,176 | 11/1990 | Buchner et al. ................... | 345/428 |
| 5,126,726 | 6/1992 | Howard et al. .................... | 345/138 |
| 5,187,754 | 2/1993 | Currin et al. ...................... | 382/284 |

(List continued on next page.)

FOREIGN PATENT DOCUMENTS

| | | | |
|---|---|---|---|
| 0 674 269 A2 | 9/1994 | (EP) | ............................ G06F/12/10 |
| 0 674 270 A2 | 3/1995 | (EP) | ............................ G06F/12/10 |
| 0 829 820 A2 | 3/1998 | (EP) | ............................... G06T/1/60 |
| WO 93/04462 | 3/1993 | (WO) | ............................. G09G/5/40 |
| WO 96/36011 | 11/1996 | (WO) . | |

OTHER PUBLICATIONS

Cole, Bernard C., "Choices Wide Open in PC–graphics Design—PCI, Proprietary Buses, UMA Architecture Redefine the Business", EE Times Interactive, Issue 860, p. 47, CMP Publications Inc., Aug. 7, 1995.

(List continued on next page.)

*Primary Examiner*—Than Nguyen
(74) *Attorney, Agent, or Firm*—Robert P. Bell; Dan Shifrin; Peter Rutkowski

(57) ABSTRACT

A virtual memory manager for a multi-media engine allows individual media units to operate in their own virtual space in much the same way as a software program operating in virtual mode. The virtual memory controller performs address translation or mapping to the correct physical memory location (in local memory or system memory) and will also convert the data stream to or from a compressed format. In addition, the virtual memory controller provides a unified TLB (translation lookaside buffer) available to all media units. The TLB has four types of pointer entries which are controlled by two bits. The first bit controls whether the TLB entry is a direct map or a pointer to another translation table. the second bit controls whether the TLB entry is stored in a compressed format. The overall concept may allow dynamic load balancing between local media memory and system memory.

21 Claims, 8 Drawing Sheets

U.S. PATENT DOCUMENTS

| | | | |
|---|---|---|---|
| 5,191,642 | 3/1993 | Quick et al. | 345/427 |
| 5,230,039 | 7/1993 | Grossman et al. | 345/430 |
| 5,263,136 | 11/1993 | DeAguiar et al. | 345/511 |
| 5,266,941 | 11/1993 | Akeley et al. | 345/508 |
| 5,268,996 | 12/1993 | Steiner et al. | 345/426 |
| 5,293,467 | 3/1994 | Buchner et al. | 345/422 |
| 5,301,288 | 4/1994 | Newman et al. | 711/202 |
| 5,313,577 | 5/1994 | Meinerth et al. | 345/515 |
| 5,321,810 | 6/1994 | Case et al. | 345/515 |
| 5,357,579 | 10/1994 | Buchner et al. | 382/100 |
| 5,367,615 | 11/1994 | Economy et al. | 345/429 |
| 5,420,970 | 5/1995 | Steiner et al. | 345/433 |
| 5,438,663 | 8/1995 | Matsumoto et al. | 345/520 |
| 5,502,808 | 3/1996 | Goddard et al. | 345/501 |
| 5,507,026 | 4/1996 | Fukushima et al. | 345/501 |
| 5,577,220 * | 11/1996 | Combs et al. | 711/206 |
| 5,649,142 * | 7/1997 | Lavelle et al. | 711/209 |
| 5,699,539 * | 12/1997 | Garber et al. | 711/2 |
| 5,790,130 | 8/1998 | Gannett | 345/430 |
| 5,790,138 * | 8/1998 | Hsu | 345/512 |

OTHER PUBLICATIONS

Sogas, Jim, "Cost Drives Choices for UMA End–users", EE Times Interactive, Issue 874, p. 98, CMP Publications Inc., Nov. 13, 1995.

Talreja, Prem, "UMA Standard Proposes Shared PC Memories", Electronic Buyers' News, Issue 969, p. 17, CMP Publications Inc., Aug. 21, 1995.

Cataldo, Anthony, "No Unity for UMA—Intel Goes It Alone vs. VESA Standard", Electronic Buyers' News, Issue 976, p. 1, CMP Publications Inc., Oct. 9, 1995.

LaPedus, Mark, "SIS Checks in with UMA Set—Latest Core Logic Also Supports Non–Intel MPU", Electronic Buyers' News, Issue 983, p. 35, CMP Publications Inc., Nov. 27, 1995.

Jeong, Deog–Kyoon et al., "A VLSI Chip Set for a Multi-processor Workstation—Part II: A memory Management Unit and Cache Controller", vol. 24, N. 6, pp. 1699–1707, IEEE Journal of Solid–State Circuits, Dec. 1989.

"Direct memory Access Paging and Remote DRAM Access Through an Optimized Memory Mapping Mechanism"; IBM Technical Disclosure Bulletin vol. 38, No. 6, Jun. 1995.

"Linear–to–Physical Memory Mapping by Bus Masters in Virtual Memory", IBM Technical Disclosure Bulletin, vol. 34, No. 4A, pp. 355–357, Sep. 1991.*

* cited by examiner

MEMORY MANAGER FOR MULTI-MEDIA APPARATUS AND METHOD THEREFOR

CROSS-REFERENCE TO RELATED APPLICATIONS

The subject matter of the present application is related to that in U.S. patent application Ser. No. 08/856,118 filed May 14, 1997 entitled "PROGRAMMABLE FOUR-TAP TEXTURE FILTER", now U.S. Pat. No. 5,920,495, and Ser. No. 08/841,360, filed Apr. 23, 1997 entitled "VIRTUAL MEMORY MANAGER FOR MULTI-MEDIA ENGINES", now U.S. Pat. No. 5,835,104, both of which are incorporated herein by reference.

FIELD OF THE INVENTION

The present invention is related to the field of multi-media integrated-circuit controllers for use with computer systems. In particular, the present invention is directed toward a virtual memory manager for use with multi-media controllers.

BACKGROUND OF THE INVENTION

Prior art computer systems generally employed a graphics controller (e.g., VGA, SGVA, or the like) such as illustrated in FIG. 1. FIG. 1 is a block diagram illustrating major components of a computer system 100 provided with display controller 120 (e.g., Video Graphics Adapter (VGA), Super VGA (SVGA) or the like). Display controller 120 may generate pixel data for display 180 (e.g., CRT, flat panel display or the like) at a rate characteristic of the refresh rate of display 180 (e.g., 60 Hz, 72 Hz, 75 Hz, or the like) and horizontal and vertical resolution of a display image (e.g., 640×480 pixels, 1024×768 pixels, 800×600 pixels or the like). A continuous stream of pixel data may be generated by display controller 120 at the characteristic rate of display 180.

Display controller 120 may be provided with a display memory 130 which may store an entire frame of pixel data in text, graphics, or video modes for output to display 180. Host CPU 110 may be coupled to display controller 120 through bus 150 and may update the contents of display memory 130 when a display image for display 180 is to be altered. Bus 150 may comprise, for example, a PCI bus or the like. System memory 160 may be provided coupled to Host CPU 110 for storing data.

Hardware MPEG decoder 140 may be provided to decode MPEG video data from an MPEG video data source (e.g., CD-ROM or the like) and output decoded video data to system memory 160 or directly to display memory 130. However, with the advent of increasingly powerful and faster microprocessors (e.g., Pentium™ or PowerPC™ processor or the like) it may be possible to implement MPEG decoding (or the like) entirely within software operating within host CPU 110.

In recent years, "multi-media" devices for computers have become popular. Multi-media, as the name implies, encompasses a number of different types of functions, such as 2-D and 3-D graphics, animation, Full Motion Video™, audio, and the like. Such devices may be used for games or for business use (e.g., teleconferencing).

Unfortunately, implementation of multi-media technology has been hampered by the lack of any coherent standard for various discreet multi-media devices (graphics controllers, CD-ROM or DVD controllers, sound cards, modems, and the like). As a result, a user may become frustrated to discover that different devices conflict with one another or will not work within his or her system.

Some attempts have been made to provide better compatabilty between multimedia devices. For example, Microsoft® has promoted the use of Plug and Play™ technology. Plug and Play™ is a standard by which various peripheral devices may be inserted into a computer system which will automatically configure the system and resolve any device conflicts.

However, even with such systems, other drawbacks are present. For example, to provide realistic three dimensional (3-D) imaging, considerable processor power may be required. Users may be reluctant to discard existing personal computer (PCs) in order to take advantage of new 3-D software.

FIG. 2 is a block diagram of one apparatus which attempts to solve this problem. The apparatus of FIG. 2 is described in more detail in *Talisman: Commodity Realtime 3D Graphics for the PC* by Jay Torborg and James T. Kajiya (Microsoft Corporation, Aug. 21, 1996) incorporated herein by reference. In FIG. 2, a single multi-media device may be provided as a plug-in card for a PC. The multi-media device may be provided with a media signal processor (MSP) 210 coupled to a system bus 200 such as a Peripheral Communications Interface (PCI) or the like.

Media I/O device 230, providing an interface for joysticks or the like (e.g., USB 1344 or the like) may be provided coupled to MSP 210, along with Audio CODEC (audio modem) 240. Polygon Object Processor 250 may render 3-D images of polygons. Image layer compositor 260 may combine a number of image layers or elements using a compositing buffer to generate an output image.

Graphics memory 270 may comprise a RDRAM or other high-speed memory. Video output may pass through COMP/DAC 280 (e.g., decompressor, RAMDAC, and the like) for color conversion and output to a display.

One disadvantage of the design of FIG. 2 is that each of the various chips may have intensive processing requirements. Graphics rendering chips 250 and 260 may have as many gates as a Pentium™ and Pentium™ PRO™ processor, respectively. Thus, the device of FIG. 2 may be relatively complex and expensive. Moreover, the many of the functions served by the apparatus of FIG. 2 may be able to be performed using more advanced host microprocessors, such as the Intel® MMX™ processor or its progeny and successors.

FIG. 3 is a block diagram of another approach to an improved multi-media controller. In the apparatus of FIG. 3, an advanced microprocessor communicates with a multimedia controller 310 over an Accelerated Graphics Port (AGP) 300 which may be a PCI-like type communications bus provided with specialized and enhanced communications features. Multimedia controller 340 incorporates may of the functions of the elements of the apparatus of FIG. 2 and in addition may rely upon an enhanced host processor to perform some multi-media functions. Multi-media controller 310 may be coupled to RDRAM 320 which may be used to store image data.

The apparatus of FIG. 3 has the advantage of being able to interface with newer processor designs. However, the apparatus of FIG. 2 may be more suitable as an upgrade to existing computers. In either design, however, the size of the semiconductor devices may become unwieldy and cost prohibitive due to the complexity of the designs and the functions to be performed. Thus, it remains a requirement in the art to provide a multi-media controller which preforms required multi-media functions with a minimal number of gates.

One proposal for simplifying graphics controller architecture is to unify or partially unify display memory with main memory of a computer. Referring back to FIG. 1, note that display memory 130 comprises an additional memory to system memory 160. Some have argued that such a system is duplicative, and that unifying the two memories 130 and 160 would reduce overall memory requirements and allow for greater component integration.

Such a system may reduce the amount of memory required for a computer system, and thus reduce overall cost of the computer. Intel® Corporation has proposed a version of Unified Memory Architecture (UMA) in which display memory is formed from a part of system memory. While such a system may reduce component count, it may also create bandwidth bottlenecks.

In particular, a CRT or other type of display requires a constant stream of data in order to generate a display image. At higher resolutions and refresh rates, this data rate may be fairly high. If the display needs to access main memory for a significant period of time, such accesses may hamper overall CPU performance. To overcome the deficiencies of UMA, the assignee of the present application has proposed a solution known as Partially Unified Memory Architecture or PUMA.

Reference is made Bril et al., co-pending U.S. patent application Ser. No. 08/624,128 (0455-VDSK) entitled "PARTIALLY UNIFIED MEMORY ARCHITECTURE", now abandoned and incorporated herein by reference. A memory controller in a Partially Unified Memory Architecture controls allocation of memory requests between one or more memory areas to enhance the performance of a display controller. The memory controller receives memory cycle requests from at least one subsystem including a display controller. A cycle distributor allocates requests to Main Memory Display Memory and Dedicated Display Memory sequencers depending on operational modes, memory configuration, and BIOS settings related to bandwidth optimization.

Bril et al. teaches that it is possible for a subsystem such as a display controller to share physical memory between local (e.g., display memory) and main (e.g., system) memory. If UMA or PUMA is to be implemented in a multi-media application, memory for a number of different devices (e.g., VGA controller, sound card, MPEG encoder, and the like) may need to be allocated and controlled on a dynamic basis.

Virtual memory mapping for computer systems is known in the art. In so-called "virtual mode" of operation, a CPU may swap data between system memory and a hard disk space. Regardless of whether data is located in system memory or on the hard disk, such memory may be virtually addressed such that addressing is not dependent on the physical location of the memory. However, such virtual memory mapping systems have generally been limited to a single device (e.g., CPU or peripheral), and thus each device may require its own virtual memory mapping manager.

SUMMARY OF THE INVENTION

The present invention comprises a virtual memory manager for a multi-media engine. A second virtual memory controller is provided unique to the media system. The second virtual memory controller allows individual media units to operate in their own virtual space in much the same way as a software program operating in virtual mode. The second virtual memory controller performs address translation or mapping to the correct physical memory location (in local memory or system memory) and will also convert the data stream to or from a compressed format.

In addition, the second virtual memory controller provides a unified TLB (translation lookaside buffer) available to all media units. The TLB has four types of pointer entries which are controlled by two bits. The first bit controls whether the TLB entry is a direct map or a pointer to another translation table. the second bit controls whether the TLB entry is stored in a compressed format. The overall concept may allow dynamic load balancing between local media memory and system memory.

DETAILED DESCRIPTION OF THE INVENTION

In multimedia systems there may be a number of different data types transferred between a number of different types of processing units. Thus, unlike a typical prior art graphics controller, a multimedia controller may be more data and data type stream oriented. Examples of different data types include textures, video, surfaces, command lists, patterns (font files and the like), WaveTable sample spaces, MPEG blocks (H.263 or H.261 type encode and decode blocks), COM buffer data, audio buffer data, and the like.

A command list or execute buffer is a list of instructions to be processed. For example, a particular multimedia unit engine, whether fixed or programmable, may have a driver with a list of instructions or commands may be a triangle list for 3D, a list of BITBLT instructions, a list of audio functions to deal with certain streams, or the like, depending upon the nature of the unit and the data processed.

Figure 1:
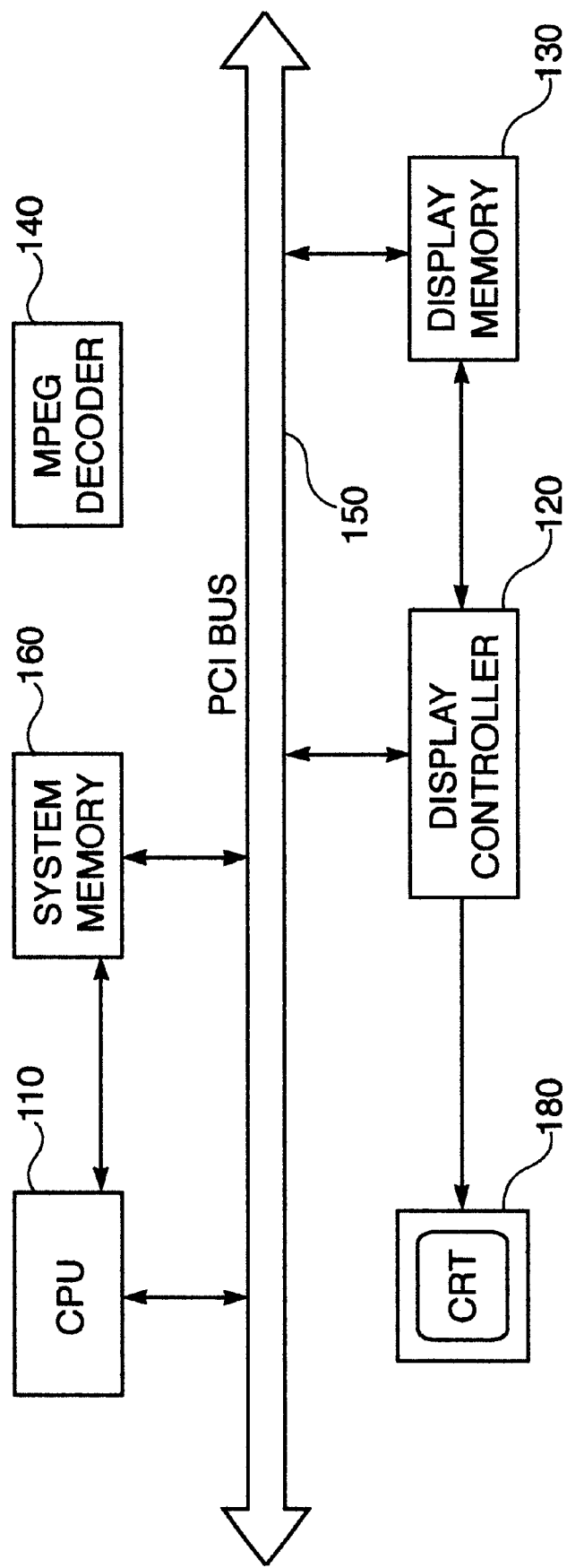
FIG. 1 is a block diagram illustrating major components of a prior art computer system provided with a display controller.
Figure 2:
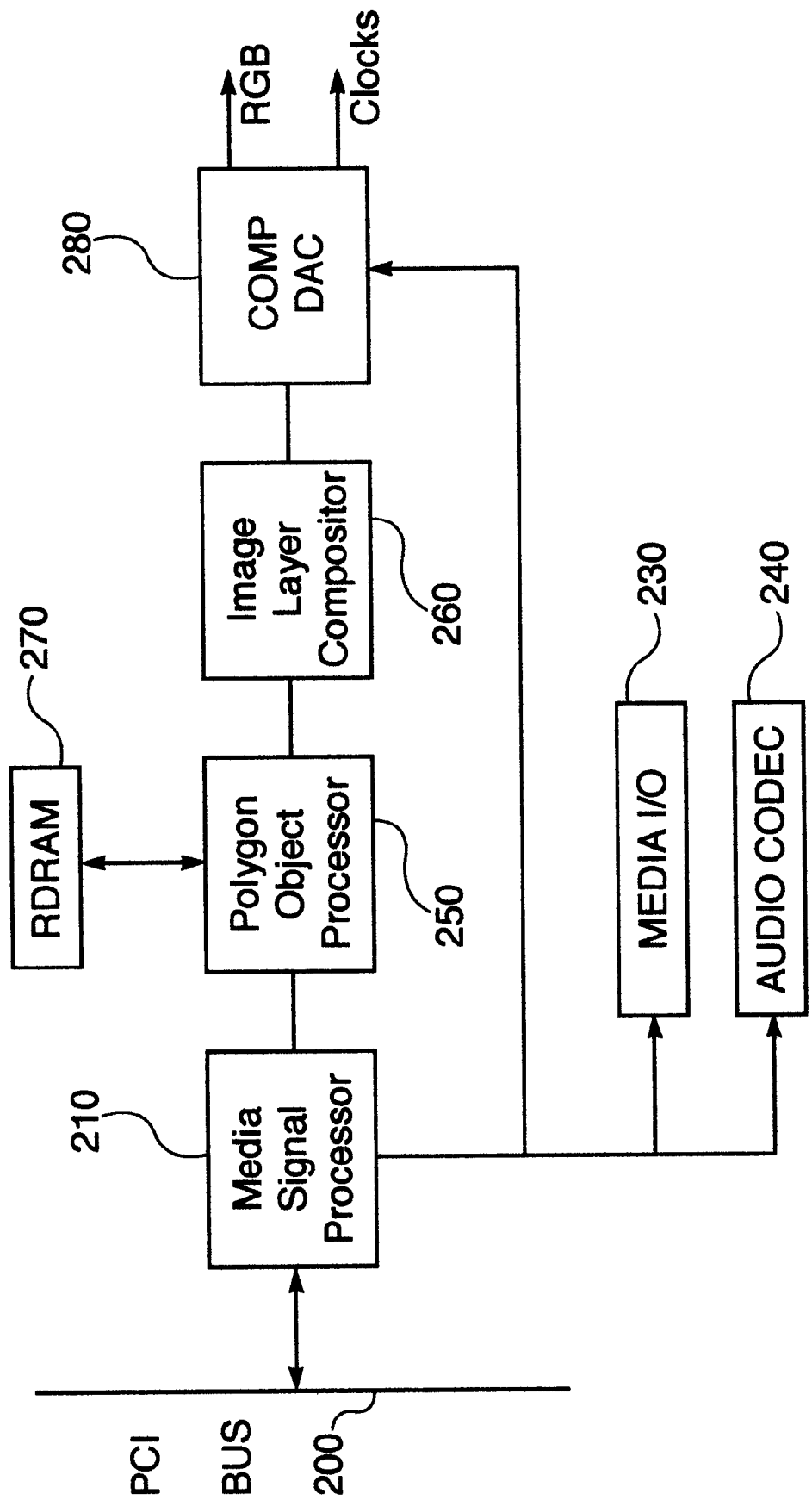
FIG. 2 is a block diagram of a proposed single multi-media device provided as a plug-in card for a PC.
Figure 3:
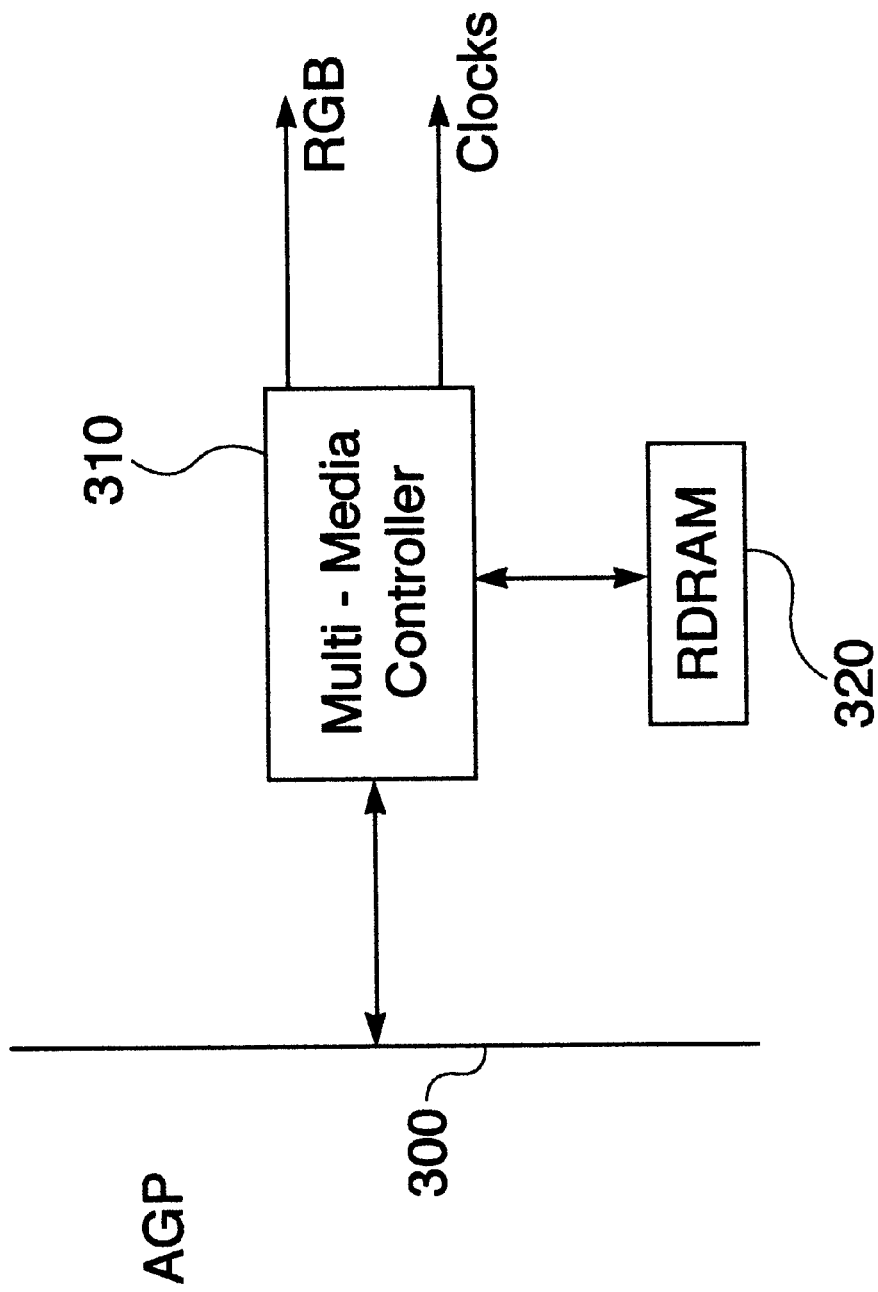
FIG. 3 is a block diagram of another proposed approach to an improved multi-media controller using an Accelerated Graphics Port.
Figure 4:
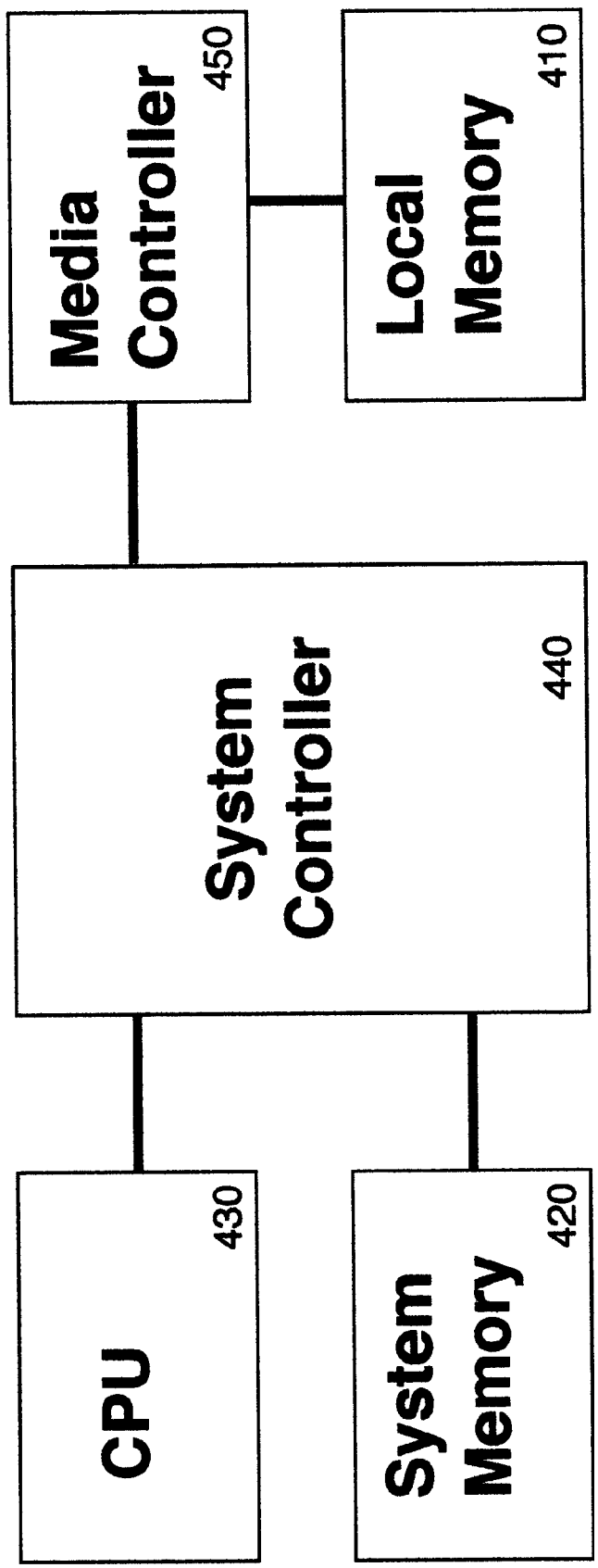
FIG. 4 is a block diagram of a present multimedia system.

FIG. 4 is a block diagram of a multimedia system. Present multimedia systems may be characterized by a software/hardware implementation, which is favored by the Microsoft™ operating system and the recent AGP Bus from Intel™. In this environment, software based in CPU 430 as well as software based software in external media controller 450 (fixed or programmable) both operate on related data. Such data may be stored in local media memory 410 or in system memory 420 as space and bandwidth requirements allow.

Media controller 450 generally does not contain a single function or unit. For example, graphics controllers have advanced to contain multiple independent units for 2D graphics, 3D graphics, video capture, video playback, and CRT refresh. Each of these units and its respective software counterpart (i.e., driver) may operate on its own set of data.

CPU 430 operates on this data through a virtual-to-physical mapping provided by the O/S. However, individual media units inside media controller 450 may still be managed through physical memory pointers to specific system or local memory space. Such a system requires explicitly determining such mapping locations, locking them down (i.e., fixing them), and programming the individual units. When the O/S decides to move such data, due to bandwidth or space concerns, the unit must be completely reprogrammed with new physical memory pointers.

In addition, many media units may be rigidly fixed and may only operate out of data in local memory or system memory. Such fixed media units do not allow performance and system resource optimization. Moreover, such data may be stored in a compressed format for both bandwidth and memory size issues. In such situations, the media unit may then be required to be aware of the data format type and perform a data format conversion before processing the data.

Figure 5:
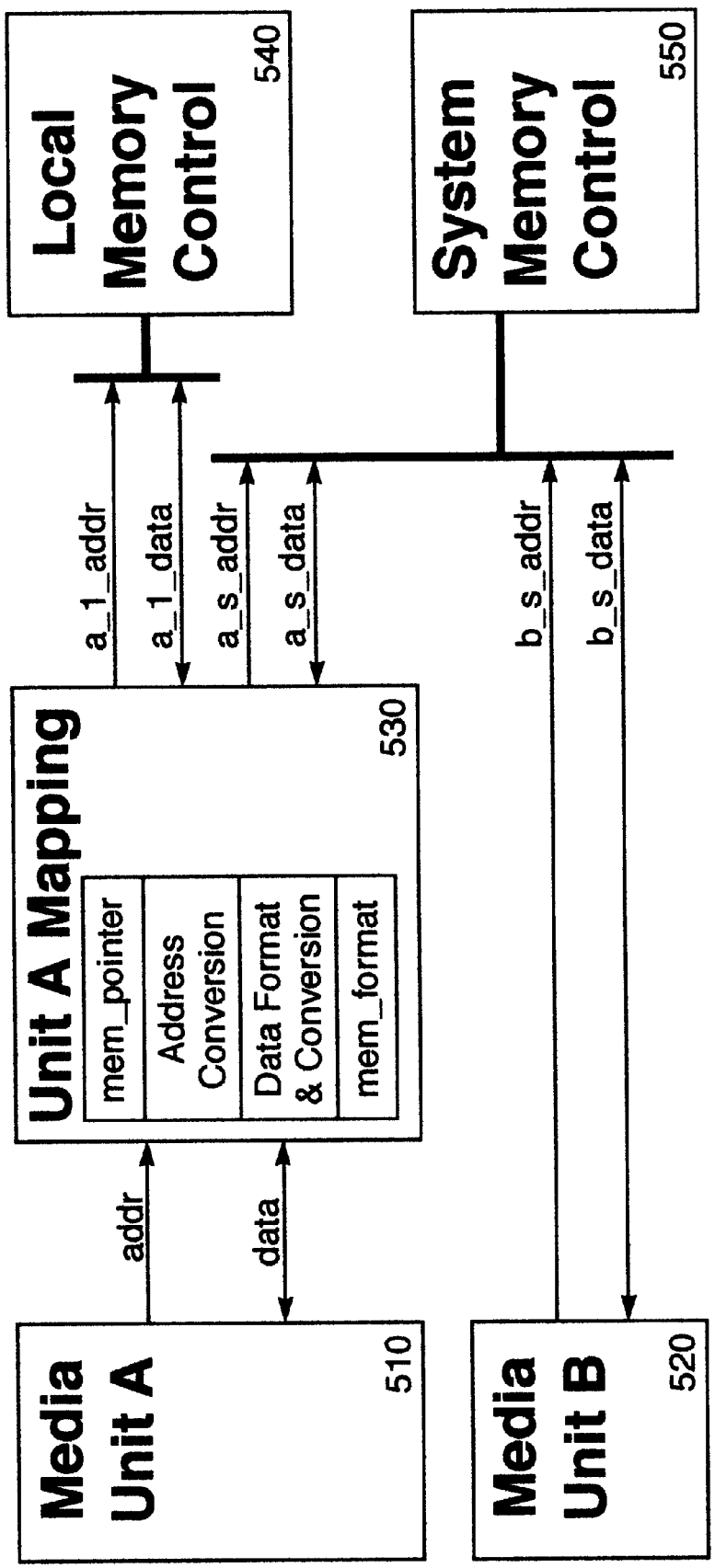
FIG. 5 is a block diagram of a media controller implementation illustrating two media units.

FIG. 5 is a block diagram of a media controller implementation illustrating two media units. For purposes of illustration, the apparatus of FIG. 5 is shown with two "general" media units 510, 520. Each of units 510, 520 may have its own mapping and conversion logic. However, in the example of FIG. 5, media unit B 520 is fixed in its source of data.

Media unit B 520 may have fixed address pointers b_s_addr to a portion of system memory 550. O/S software may reprogram media unit B 520 to relocate address pointers b_s_addr. However, such programming may not redirect data to other memories (e.g., local memory).

Media unit A 510 may contain stand-alone virtual memory mapping unit 530. Virtual memory mapping unit 530 may create a virtual memory map for media unit A 510 such that media unit A 510 may address data using address pointer addr which in turn is re-mapped to system memory control 550 or local memory control 540 using address pointers a_s_addr and a_l_addr, respectively. Media unit A 510 may thus address data without regard for the location of that data in system or local memory.

However, note that virtual memory mapping unit 530 provides memory mapping for only one media unit.

Figure 6:
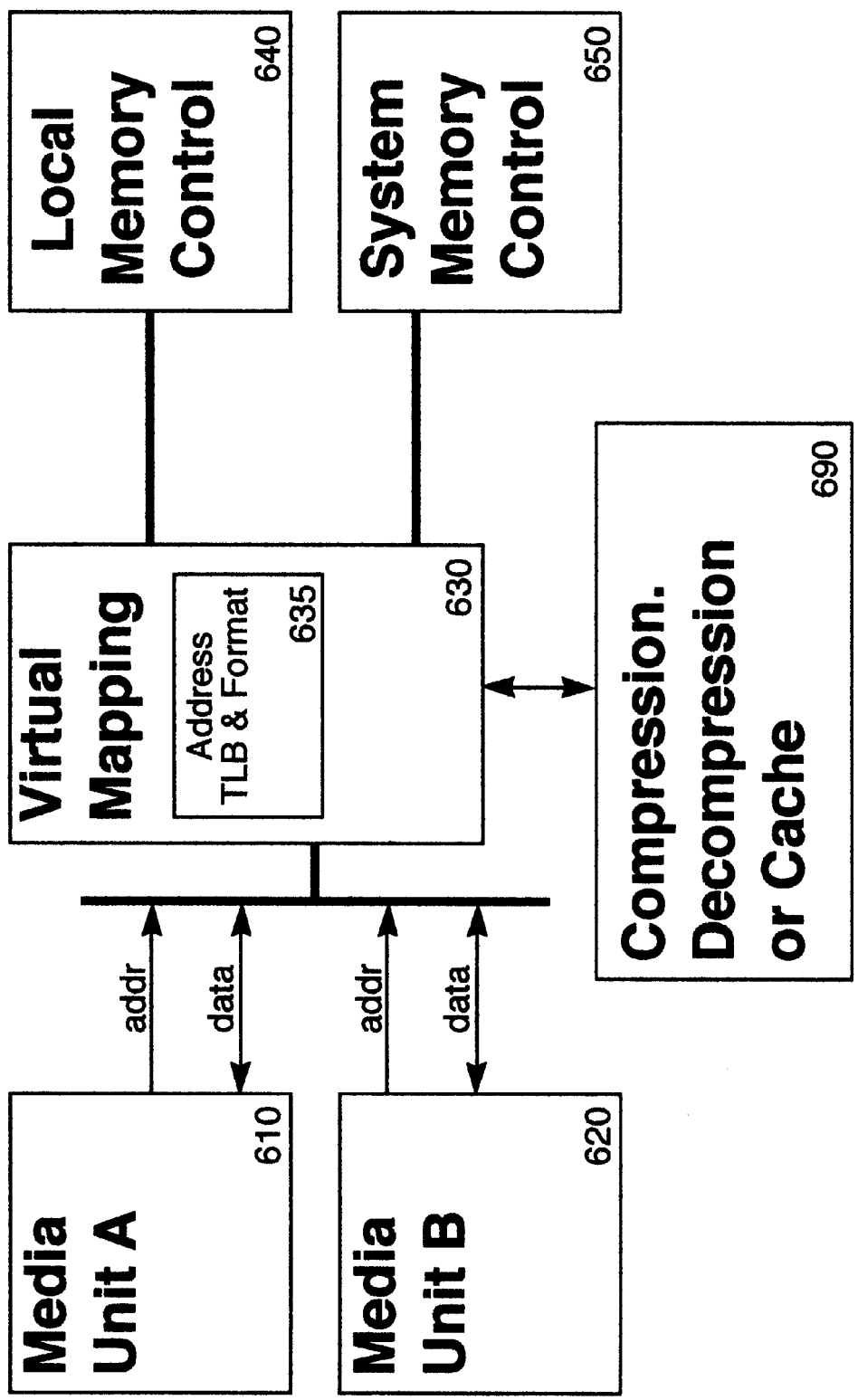
FIG. 6 is a simplified block diagram of a multimedia virtual memory mapping system of the present invention.

FIG. 6 is a simplified block diagram of a virtual mapping multimedia system of the present invention. In the present invention, memory space is virtualized away from hardware units of a media controller. In this way, each hardware unit 610, 620 need not be aware whether memory is access through local memory control 640, system memory control 650, or be compressed, uncompressed, or cached by block 690. Load balancing and latency requirements become an operating system or device management issue. Simply changing or updating pointers in a virtual memory translation table 635 is all that is required.

The apparatus of FIG. 6 also allows units 610, 620 which have traditionally have not had access to other memory spaces to utilize them. With the bandwidth provided by AGP, this approach provides some unique opportunities and clear advantages over the traditional approach.

The present invention uses a multi-media virtual memory controller 630 for the media system. Here, the phrase "multi-media" is used to distinguish the virtual memory controller 630 for the media system from any other virtual system memory controller (e.g., for generating virtual memory addresses in system memory and a hard disk drive, or a dedicated virtual memory controller for a single device).

The use of the term "multi-media" which also describes the preferred embodiment and best mode, should not be taken as limiting the invention to only a multi-media environment.

The multi-media virtual memory controller 630 of the present invention allows individual media units 610, 620 to operate in their own virtual space, much the same way as a software program running on an O/S would do today. Multi-media virtual memory controller 630 receives address data addr from units 610, 620 and performs an address translation or mapping to the correct physical memory location in local or system memory through local memory control 640 or system memory control 650, respectively.

Multi-media virtual memory controller 630 may also convert the data stream to and from a compressed format if it has been identified as such. Thus, uncompressed data may be stored in a compressed format by block 690 and then decompressed in block 690 when read by a unit 610, 620. Unit 610, 620 may not be aware of such compression/decompression activity occurring and thus compression/decompression software or hardware is not needed for each unit 610, 620. In the prior art, each unit may be provided with its own unique compression/decompression hardware or software, greatly expanding the complexity of a multi-media device.

In addition, block 690 may also monitor caching of data in virtual memory. Again, each unit 610,620 may not be aware such caching takes place, and the use of a centralized caching block 690 eliminates the need for redundant circuitry in each multi-media unit 610,620.

Multi-media virtual memory controller 630 is provided with a centralized and unitized translation lookaside buffer (TLB) which keeps track of the relationship between physical and virtual memory pointers for all units 610,620. By providing a centralized TLB, all units 610, 620 may operate from one TLB, and thus avoid memory conflicts and the like. If one unit 610,620 (or a host CPU) relocates a block of data, or if multi-media virtual memory controller 630 relocates a block of data for bandwidth or space considerations, all units 610, 620 (as well as a host CPU) will still be able to access that data without conflict.

TLB 635 may have four types of pointer entries which may be controlled with two bits in the preferred embodiment. However, the number of bits may be expanded within the spirit and scope of the present invention. The first bit may control whether the TLB entry is a direct map or a pointer to another translation table. This first bit allows complex scatter-gather tables to be used or to point to a portion of a page table of a host CPU. A scatter-gather table allows a block of memory to be divided up (i.e., scattered) within a physical memory if a contiguous block of memory is not available.

The second bit may control whether the TLB entry is stored in a compressed format. The use of a second bit to indicate compression is one of the unique features of the present invention and further distinguishes the present invention from prior art virtual memory managers.

In addition, block 690 may also provide a cohesive technique for caching memory traffic and allowing dynamic load balancing between local media memory and system memory. As all memory mapping for units 610, 620 passes through multi-media virtual memory controller 630, block 690 can monitor memory accesses and control caching accordingly. Block 690 may incorporate a cache memory itself, or may use an external cache. In addition, local memory may be used as a "cache" with less frequently accessed data relegated to system memory.

Figure 8:
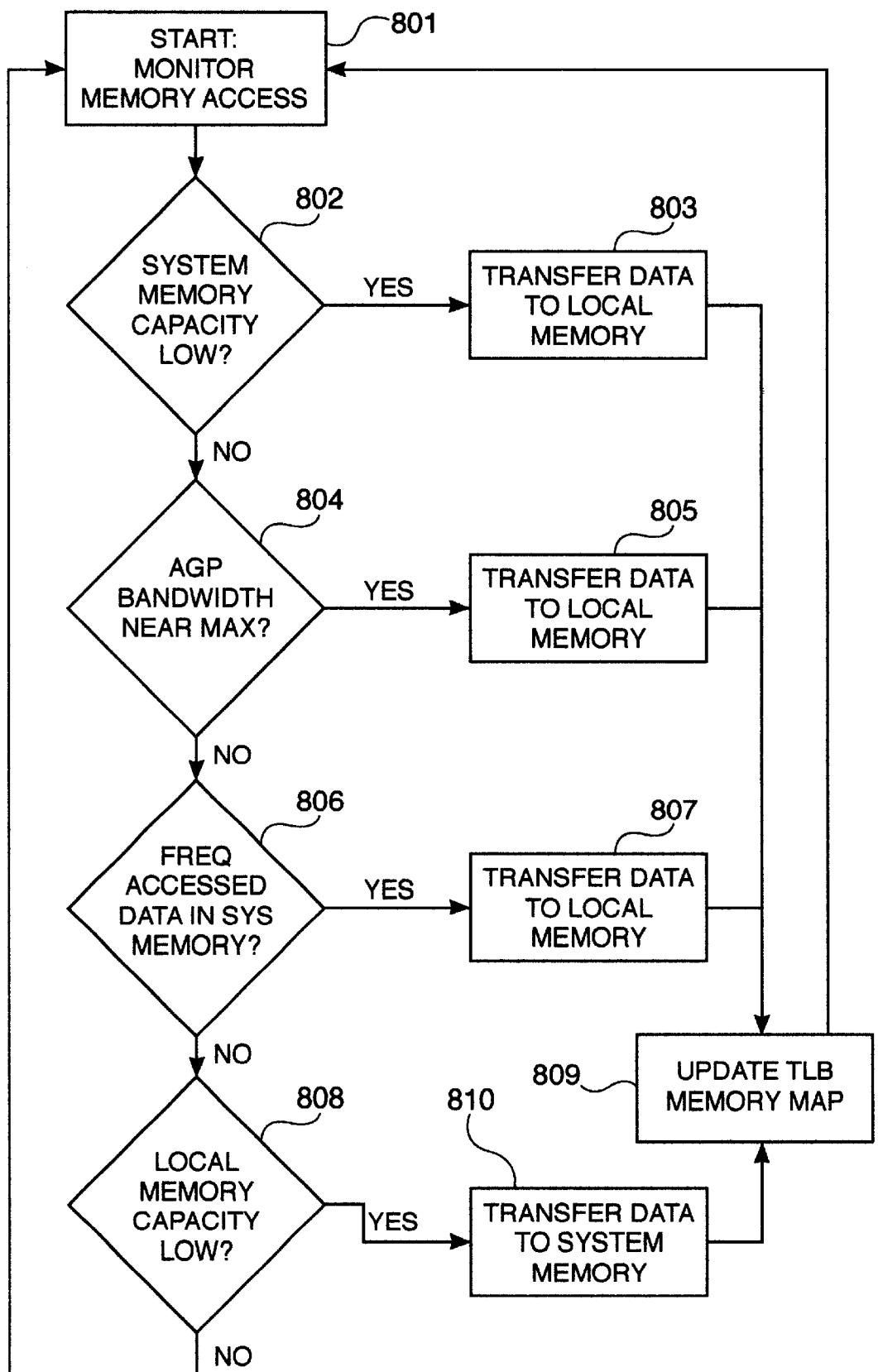
FIG. 8 is a flowchart illustrating the steps in memory allocation by the multimedia virtual mapping system of the present invention.

FIG. 8 is a flowchart illustrating the steps in memory allocation by the multimedia virtual mapping system of the present invention. Block 690 of FIG. 6 may balance memory loads dynamically between local memory controller 640 and system memory controller 650. In step 801, block 690 monitors memory accesses and bus traffic on local and system memory busses. In step 802, if block 690 determines that system memory capacity available for multimedia applications is running low, block 690 may transfer data via local memory control 640 in step 803 to local memory and update the TLB memory map in step 809.

In step 804, if an inordinate amount of traffic occurs between units 610,620 and system memory (e.g., across and AGP bus or the like) such data may be transferred dynamically to local memory via local memory control 640 in step 805 to reduce bandwidth requirements on the AGP bus. Again, since multi-media virtual memory controller 630 monitors all memory transactions between units 610,620 and memory, it is a simple task to dynamically balance loads accordingly. The TLB memory map is updated in step 809 and processing returns to monitoring state 801.

In step 806, block 690 may determine that data frequently accessed by one or more units 610,620 resides in system memory. If so, such data may be transferred to local memory in step 807. Transferring such data to local memory frees up the AGP bus for other duties and allows for faster access of such data. Again, the TLB allows for faster access of such data. Again, the TLB memory map is updated in step 809 such that the entire process appears seamless and transparent to units 610,620.

Dynamic load balancing may also occur if local memory becomes full or is near full as illustrated in step 808. Data may be re-allocated between system resources in a seamless and transparent manner in step 810 and the TLB memory map updated to reflect these new data locations in step 809. There is no need to reprogram each of units 610, 620 to achieve such load balancing, and units 610, 620 will not even be aware that such data has been moved to new memory locations.

In addition, the use of multi-media virtual memory is mapping controller 630 allows the O/S to map the system's virtual memory translation table on top of the multi-media virtual space, allowing units 610,620 and related media software to both work from the same virtual memory mapping plan. Thus, data mapped to system memory through system memory control 650 may in turn be re-mapped again by a virtual memory controller for the system, again, in a seamless and transparent manner.

Figure 7:
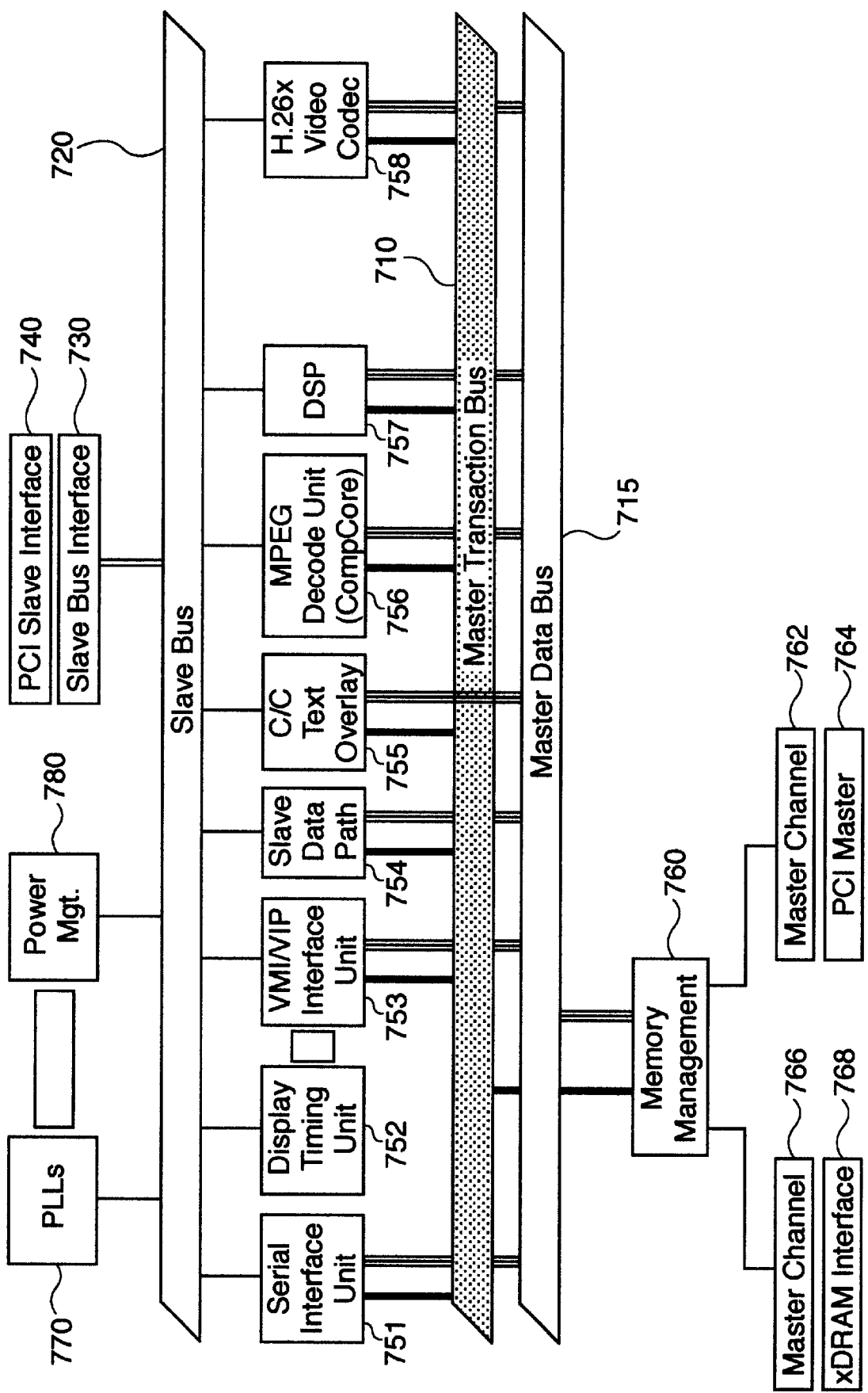
FIG. 7 is a block diagram of a multimedia apparatus which may incorporate the present invention.

FIG. 7 is a block diagram of a multimedia apparatus which may incorporate the present invention. Whereas FIG. 6 presented a simplified block diagram to aid in the understanding of the present invention, FIG. 7 presents a detailed block diagram which also illustrates the preferred embodiment and best mode contemplated of the present invention. FIG. 7 also better illustrates the number of individual units which may be present in a multi-media device.

The architecture of the multimedia apparatus of FIG. 7 may be known as Cirrus Media Architecture, or CMA, and incorporates an Active-X™ accelerator. Active-X™ is a trademark of Microsoft Corporation and describes a type of graphics rendering more powerful that Microsoft Direct-X™. Active-X™ deals with active movie, MPEG (Motion Picture Expert Group) DVD (Digital Video, or Digital Versatile Disk) playback, audio streams, video streams, and the like. Such an embodiment may be referred to as a "streaming engine".

The multimedia apparatus of FIG. 7 collects, within one structure, different units 751, 752, 753, 754, 755, 756, 757, and 758 along a master transaction bus 710 and data bus 715 and slave bus 720 to interface with different types of multimedia data. A PCI slave interface 730 and slave bus interface 740 may interface slave bus 720 to a host. Note that PCI slave interface 730 is technology independent, and thus may incorporate other types of bus interfaces such as the Advanced Graphics Port (AGP). Thus, PCI slave interface 730, for example, may be substituted with an AGP slave interface without departing from the spirit and scope of the present invention.

Units 751, 752, 753, 755, 756, 757, and 758 may comprise a number of specific blocks for manipulating forms of multi-media data. For example, serial interface unit 751 may be provided as a general purpose serial interface which may typically be used for audio processing. Serial interface unit 751 may pull data from a data buffer in memory and send it to another location (e.g., serial CODEC or via PCI master bus 715 to a USB port). For example, serial interface unit 751 may take data from a buffer generated by DSP 757 (discussed below) and output that data, through an a/D converter, to a speaker. Alternately, serial interface unit 751 may receive data through a microphone and store it into a buffer in local or system memory.

Display timing unit 752 may generate timing signals for a video display (e.g., CRT, flat panel display, or the like).

VMI/VIP (Video Media Interface & Video Interface Port) interface unit 753 provides a connection between a video device and a graphics controller. Just as serial interface unit 751 processes audio data, VMI/VIP interface unit 753 may take data from a frame buffer and output it to a display, or alternately take video input (e.g., from a camera) and store it in memory for further processing.

Slave data path 754 may provide a data path between slave bus 720 (and by extension a PCI or AGP bus) and master data bus 715. Slave data path 754 may allow virtual memory manager 760 a path for storing data through PCI slave bus interface 740 to system memory (not shown). In addition, slave data path 754 may provide a data path for a host CPU (not shown) to access virtual memory manager 760 through PCI slave interface 740.

Closed-captioning text overlay unit 755 may receive closed-captioning data, either within a video or audio data stream or as a separate data stream, and generate closed-captioning text data for display. Typically, closed captioning data may be received from a DVD data stream and stored in system memory. VMI/VIP interface unit may then pull closed captioning data from system memory and overlay closed captioning text over a video image.

MPEG decode unit 756 may decode a stream of MPEG data from a number of sources (e.g., DVD or the like) and c generate frames of audio and/or video display data as it is needed for display.

Digital signal processor (DSP) 757 may comprise one or more digital signal processing circuits for processing multimedia data. Such DSPs my process, for example, audio or video (MPEG) data or the like, and may comprise, for example, a DVD accelerator device. DSP 757 may process one-dimensional (1-D) video data streams, wavetable MIDI samples, and the like, and parse audio commands to build data streams which may be then output into buffers in main memory or local memory for later playback (e.g., though speakers).

H.26X Video Codec 758 may be provided for encoding and decoding video data coded in the H.261 or H.263 formats. H.261 and H.263 are video data standards which may be used for video conferencing applications. H.26x codec 758 may comprise an encoder/decoder for either one (or both) of H.261 or H.263 standards, or other similar standards.

PLLs 770 may comprise phase locked loop(s) for generating appropriate multi-media system and bus clocks. Power management block 780 may be provided to shut down individual units, portions thereof, or the entire multimedia system, in order to conserve power.

Each of units 751, 752, 753, 754, 755, 756, 757, and 758 may have the ability to master their own local memory or master to system memory over the PCI (or AGP) bus. Each of units 751, 752, 753, 754 755, 756, 757, and 758 may put transaction and requests onto master transaction bus 710. Virtual memory manager 760 may then determine which unit has made a request, and then will partition to the right location in local memory of through PCI (or AGP) slave interface 730 to main memory (not shown). Virtual memory manager 760 is analogous to multi-media virtual memory controller 630 of FIG. 6.

Main memory may comprise a portion of system memory, or it may be a virtual memory within display memory or other PCI memory space. System memory is probably the most likely place for main memory to reside, as the operating system (O/S) will try to keep everything in system memory. An operating system such as Windows™ 3.11, Windows™ 95, or Windows™ NT may store data from a data stream in system memory.

However, device drivers may then grab such data and move it to a dedicated memory in a particular device (e.g., graphics device or the like). In the present invention, by virtualizing memory, such memory transactions across buses may be reduced or eliminated. Rather than have the device driver move data from system memory to local memory, that portion of the system memory may be made a virtual portion of the device memory.

Memory manager 760 may be responsible for keeping track of virtual memory mapping for all of units 751, I!5 752, 753, 755, 756, 756, and 758. Memory management 760 may route data through master channel 766 to xDRAM interface 768 which may interface to local memory (not shown). xDRAM interface 768 may interface to conventional DRAM, SDRAM, RDRAM, SRAM, or the like.

Local memory may comprise, for example, display memory for a graphics controller, or code space for an audio controller. xDRAM interface 768 may interface to a plurality of local memories or memory types, whether on-chip or off chip.

As discussed above in connection with FIG. 6, additional bits may be associated with data addresses for use with the translation table within virtual memory manager 760. Such bits may indicate that a memory address does in fact correspond to a physical address. Or, they may reference a scatter-gather list illustrating how a piece of memory is allocated. Other bits may indicate that data stored at that address may be compressed (MPEG compression or some other form of block compression).

Compression may be very relevant especially for architectures like Talisman™ where data may be stored in compressed form. in the present invention, a unit may save data in an uncompressed mode and virtual memory manager 760 may perform all compression and storage functions. In addition, virtual memory manager 760 may be accessed by all units 751, 752, 753, 754, 755, 756, 757, and 758. Texture compression, image compression, and other types of compression may be managed centrally by virtual memory manager 760.

For example, a block in system memory is in uncompressed form. It may be transferred from system memory into local memory, and in that step, virtual memory manager 760 may compress it. Memory space containing compressed data may be referred to as compressed space. The use of such compression techniques in and of themselves is well known in the art. For example, in a graphics controller, it may be difficult to fit a number of surfaces into 4 MB of local memory, unless it is compressed.

Talisman™, MPEG, H.261, and H.263, all use a similar type of discrete cosine transform (DCT) block compression. Quantization factors for each compression type may be altered, which may be handled by virtual memory manager 760.

Virtual memory manager 760 may also cache data as discussed above in connection with FIG. 6. Virtual memory manager 760 may cache data either internally, or in an external cache memory (not shown) such as an SRAM cache.

As a number of functions which heretofore had been performed separately in different media units are now performed centrally within virtual memory manager 760, a number of other advantages may be realized. For example, driver software for units 751, 752, 5753, 754, 755, 756, 757, and 758 may be considerably simplified, as virtual memory management, compression, and caching need not be addressed by unit driver software.

As discussed above in connection with FIG. 6, another advantage of the present invention is that it allows a number of metrics (performance measurement indicia) to be placed at each TLB entry. Virtual memory manager 760 driver software may then determine which memory locations are being accessed a lot, and dynamically balance memory loads accordingly without disrupting individual units.

It may be appreciated after reading the above disclosure that the present invention allows redundant memory mapping circuitry for a plurality of units in a multi-media system to be combined and centralized. By combining memory mapping functions for a number of units in a multi-media system, the overall size and complexity of the system may be reduced. Further, strategic advantages in memory management are realized by performing virtual memory mapping for a number of units in one apparatus. Such a system may make heretofore complex and costly multi-media proposals and systems cost effective and practical to implement.

Although the present invention has been illustrated and described in detail, it is clearly understood that the same is by way of illustration and example only and is not to be taken by way of limitation, the scope and spirit of the present invention being limited only the terms of the appended claims.

What is claimed is:

1. A memory manager for use in a multi-media system including a host processor, a system semiconductor memory. a plurality of multimedia data processing units, and a local semiconductor memory, said memory manager comprising:

a memory mapping controller coupled to the plurality of multimedia data processing units, the system semiconductor memory, and the local semiconductor memory, the memory mapping controller receiving memory access requests from the plurality of multimedia data processing units and mapping memory access requests from the plurality of multimedia data processing units to corresponding portions of the system semiconductor memory and the local semiconductor memory;

a memory map storage means, coupled to the memory mapping controller, for storing a memory map translating memory addresses for memory space for the plurality of multimedia data processing units to physical memory addresses in the system semiconductor memory and a local semiconductor memory; and means for compressing and decompressing data stored in the system semiconductor memory and the local semiconductor memory, wherein said memory map storage means further includes means for indicating whether data stored in a portion of said system semiconductor memory and the local semiconductor memory is in compressed or decompressed form, wherein said means for compressing and decompressing data stored in the system semiconductor memory and the local semiconductor memory accesses said memory map storage means to determine whether data to be stored in an accessed portion of said system semiconductor memory and the local semiconductor memory is to be compressed and compresses data written to the portion of said system semiconductor memory and the local semiconductor memory, and wherein said means for compressing and decompressing data stored in the system semiconductor memory and the local semiconductor memory accesses said memory map storage means to determine whether data to be retrieved from an accessed portion of said system semiconductor memory and the local semiconductor memory is compressed and decompresses data read from the portion of said system semiconductor memory and the local semiconductor memory.

2. The memory manager of claim 1, wherein said memory mapping controller maps memory access requests from the plurality of multimedia data processing units to portions of the system semiconductor memory and the local semiconductor memory according to the memory map stored in said memory map storage means.

3. The memory manager of claim 2, wherein said plurality of multimedia data processing units comprise video, audio, and data processing units for processing types of multimedia data.

4. The memory manager of claim 1, further comprising:

a data cache, coupled to the memory controller, for caching data frequently accessed by one or more of the plurality of multimedia data processing units.

5. A memory manager for use in a multi-media system including a host processor, a system semiconductor memory, a plurality of multimedia data processing units, and a local semiconductor memory, said memory manager comprising:

a memory mapping controller coupled to the plurality of multimedia data processing units, the system semiconductor memory, and the local semiconductor memory, the memory mapping controller receiving memory access requests from the plurality of multimedia data processing units and mapping memory access requests from the plurality of multimedia data processing units to corresponding portions of the system semiconductor memory and the local semiconductor memory;

a memory map storage means, coupled to the memory mapping controller, for storing a memory map translating memory addresses for memory space for the plurality of multimedia data processing units to physical memory addresses in the system semiconductor memory and a local semiconductor memory, wherein said memory mapping controller mass memory access requests from the plurality of multimedia data processing units to portions of the system semiconductor memory and the local semiconductor memory according to the memory map stored in said memory map storage means, and wherein said memory controller monitors frequency of access of data in said portions of system semiconductor memory and said portions of local semiconductor memory and dynamically transfers frequently accessed data from system semiconductor memory to local semiconductor memory and updates the memory map to indicate new locations for transferred data.

6. A memory manager for use in a multi-media system including a host processor, a system semiconductor memory, a plurality of multimedia data processing units, and a local semiconductor memory, said memory manager comprising:

a memory mapping controller coupled to the plurality of multimedia data processing units, the system semiconductor memory, and the local semiconductor memory, the memory mapping controller receiving memory access requests from the plurality of multimedia data processing units and mapping memory access requests from the plurality of multimedia data processing units to corresponding portions of the system semiconductor memory and the local semiconductor memory;

a memory map storage means, coupled to the memory mapping controller, for storing a memory map translating memory addresses for memory space for the plurality of multimedia data processing units to physical memory addresses in the system semiconductor memory and a local semiconductor memory, wherein said memory mapping controller mass memory access requests from the plurality of multimedia data processing units to portions of the system semiconductor memory and the local semiconductor memory according to the memory map stored in said memory map storage means, and wherein said memory controller monitors data transfer bandwidth of the system semiconductor memory and the local semiconductor memory and dynamically transfers frequently accessed data between system semiconductor memory and local semiconductor memory to reduce data transfer bandwidth of the system semiconductor memory and the local semiconductor memory and updates the memory map to indicate new locations for transferred data.

7. A memory manager for use in a multi-media system including a host processor, a system semiconductor memory, a plurality of multimedia data processing units, and a local semiconductor memory, said memory manager comprising:

a memory mapping controller coupled to the plurality of multimedia data processing units, the system semiconductor memory, and the local semiconductor memory, the memory mapping controller receiving memory access requests from the plurality of multimedia data processing units and mapping memory access requests from the plurality of multimedia data processing units to corresponding portions of the system semiconductor memory and the local semiconductor memory;

a memory map storage means, coupled to the memory mapping controller, for storing a memory map translating memory addresses for memory space for the plurality of multimedia data processing units to physical memory addresses in the system semiconductor memory and a local semiconductor memory, wherein said memory mapping controller mass memory access requests from the plurality of multimedia data processing units to portions of the system semiconductor memory and the local semiconductor memory according to the memory map stored in said memory map storage means, and wherein said memory controller monitors available memory capacity of the system semiconductor memory and the local semiconductor memory and dynamically transfers data between system semiconductor memory and local semiconductor memory to increase available memory capacity of one of the system semiconductor memory and the local semiconductor memory and updates the memory map to indicate new locations for transferred data.

8. A multi-media apparatus for processing multi-media data, comprising:

a plurality of multimedia data processing units, each for processing multi-media data and reading and storing data in memory;

a memory mapping controller coupled to the plurality of multimedia data processing units and to a system semiconductor memory and a local semiconductor memory, the memory mapping controller receiving memory access requests from the plurality of multimedia data processing units and mapping memory access requests from the plurality of multimedia data processing units to corresponding portions of the system semiconductor memory and the local semiconductor memory; and a memory map storage means, coupled to the memory mapping controller, for storing a memory map translating memory addresses for memory space for the plurality of multimedia data processing units to physical memory addresses in the system semiconductor memory and the local semiconductor memory, wherein said memory manager further comprises:

means for compressing and decompressing data stored in the system semiconductor memory and the local semiconductor memory, wherein said memory map storage means further includes means for indicating whether data stored in a portion of the system semiconductor memory and the local semiconductor memory is in compressed or decompressed form, wherein said means for compressing and decompressing data stored in the system semiconductor memory and the local semiconductor memory accesses said memory map storage means to determine whether data to be stored in an accessed portion of the system semiconductor memory and the local semiconductor memory is to be compressed and compresses data written to the portion of the system semiconductor memory and the local semiconductor memory, and wherein said means for compressing and decompressing data stored in the system semiconductor memory and the local semiconductor memory accesses said memory map storage means to determine whether data to be retrieved from an accessed portion of the system semiconductor memory and the local semiconductor memory is compressed and decompresses data read from the portion of the system semiconductor memory and the local semiconductor memory.

9. The multi-media apparatus of claim 8, wherein said memory mapping controller maps memory access requests from the plurality of multimedia data processing units to portions of the system semiconductor memory and the local semiconductor memory according to the memory map stored in said memory map storage means.

10. The multi-media apparatus of claim 9, wherein said plurality of multimedia data processing units comprise video, audio, and data processing units for processing types of multimedia data.

11. The multi-media apparatus of claim 8, wherein said memory manager further comprises:

a data cache, coupled to the memory controller, for caching data frequently accessed by one or more of the plurality of multimedia data processing units.

12. A multi-media apparatus for processing multi-media data, comprising:

a plurality of multimedia data processing units, each for processing multi-media data and reading and storing data in memory;

a memory mapping controller coupled to the plurality of multimedia data processing units and to a system semiconductor memory and a local semiconductor memory, the memory mapping controller receiving memory access requests from the plurality of multimedia data processing units and mapping memory access requests from the plurality of multimedia data processing units to corresponding portions of the system semiconductor memory and the local semiconductor memory; and a memory map storage means, coupled to the memory mapping controller, for storing a memory may translating memory addresses for memory space for the plurality of multimedia data processing units to physical memory addresses in the system semiconductor memory and the local semiconductor memory, wherein said memory mapping controller maps memory access requests from the plurality of multimedia data processing units to portions of the system semiconductor memory and the local semiconductor memory according to the memory map stored in said memory map storage means, and wherein said memory controller monitors frequency of access of data in said portions of system semiconductor memory and said portions of local semiconductor memory and dynamically transfers frequently accessed data from system semiconductor memory to local semiconductor memory and updates the memory map to indicate new locations for transferred data.

13. A multi-media apparatus for processing multi-media data, comprising:

a plurality of multimedia data processing units, each for processing multi-media data and reading and storing data in memory;

a memory mapping controller coupled to the plurality of multimedia data processing units and to a system semiconductor memory and a local semiconductor memory, the memory mapping controller receiving memory access requests from the plurality of multimedia data processing units and manning memory access requests from the plurality of multimedia data processing units to corresponding portions of the system semiconductor memory and the local semiconductor memory; and a memory map storage means, coupled to the memory mapping controller, for storing a memory may translating memory addresses for memory space for the plurality of multimedia data processing units to physical memory addresses in the system semiconductor memory and the local semiconductor memory, wherein said memory mapping controller maps memory access requests from the plurality of multimedia data processing units to portions of the system semiconductor memory and the local semiconductor memory according to the memory map stored in said memory map storage means, and wherein said memory controller monitors data transfer bandwidth of the system semiconductor memory and the local semiconductor memory and dynamically transfers frequently accessed data between system semiconductor memory and local semiconductor memory to reduce data transfer bandwidth of the system semiconductor memory and the local semiconductor memory and updates the memory map to indicate new locations for transferred data.

14. A multi-media apparatus for processing multi-media data, comprising:

a plurality of multimedia data processing units, each for processing multi-media data and reading and storing data in memory;

a memory mapping controller coupled to the plurality of multimedia data processing units and to a system semiconductor memory and a local semiconductor memory, the memory mapping controller receiving memory access requests from the plurality of multimedia data processing units and mapping memory access requests from the plurality of multimedia data processing units to corresponding portions of the system semiconductor memory and the local semiconductor memory; and a memory map storage means, coupled to the memory mapping controller, for storing a memory map translating memory addresses for memory space for the plurality of multimedia data processing units to physical memory addresses in the system semiconductor memory and the local semiconductor memory, wherein said memory mapping controller maps memory access requests from the plurality of multimedia data processing units to portions of the system semiconductor memory and the local semiconductor memory according to the memory map stored in said memory map storage means, and wherein said memory controller monitors available memory capacity of the system semiconductor memory and the local semiconductor memory and dynamically transfers data between system semiconductor memory and local semiconductor memory to increase available memory capacity of one of the system semiconductor memory and the local semiconductor memory and updates the memory map to indicate new locations for transferred data.

15. A method for managing memory for a plurality of data processing multimedia data processing units coupled to the system semiconductor memory and the local semiconductor memory, said method comprising the steps of:

receiving, in a memory mapping controller coupled to the plurality of multimedia data processing units and to the system semiconductor memory and the local semiconductor memory, memory access requests from the plurality of multimedia data processing units, translating memory addresses for memory space for the plurality of multimedia data processing units to corresponding physical memory addresses in the system semiconductor memory and the local semiconductor memory according to a memory map, and mapping memory access requests from the plurality of multimedia data processing units to portions of the system semiconductor memory and the local semiconductor memory, reading, from the memory map, data indicating whether data stored in a portion of the system semiconductor memory and the local semiconductor memory is in compressed or decompressed form, determining, from the memory map whether data to be stored in an accessed portion of the system semiconductor memory and the local semiconductor memory is to be compressed, and compressing data written to the portion of the system semiconductor memory and the local semiconductor memory if the data is determined to be compresses.

16. The method of claim 15, wherein the step of mapping memory access requests comprises the step of:

mapping memory access requests from the plurality of multimedia data processing units to portions of the system semiconductor memory and the local semiconductor memory according to the memory map stored in the memory map storage means.

17. The method of claim 16, wherein the plurality of multimedia data processing units comprise video, audio, and data processing units for processing types of multimedia data.

18. The method of claim 15, further comprising the step of:

caching data frequently accessed by one or more of the plurality of multimedia data processing units in a data cache coupled to the memory controller.

19. A method for managing memory for a plurality of data processing multimedia data processing units coupled to the system semiconductor memory and the local semiconductor memory, said method comprising the steps of:

receiving, in a memory mapping controller coupled to the plurality of multimedia data processing units and to the system semiconductor memory and the local semiconductor memory, memory access requests from the plurality of multimedia data processing units, translating memory addresses for memory space for the plurality of multimedia data processing units to corresponding physical memory addresses in the system semiconductor memory and the local semiconductor memory according to a memory map, mapping memory access requests from the plurality of multimedia data processing units to portions of the system semiconductor memory and the local semiconductor memory, monitoring, in the memory controller, frequency of access of data in the portions of system semiconductor memory and the portions of local semiconductor memory, dynamically transferring frequently accessed data from system semiconductor memory to local semiconductor memory, and updating the memory map to indicate new locations for transferred data, wherein the step of mapping memory access requests comprises the step of:

mapping memory access requests from the plurality of multimedia data processing units to portions of the system semiconductor memory and the local semiconductor memory according to the memory may stored in the memory map storage means.

20. A method for managing memory for a plurality of data processing multimedia data processing units coupled to the system semiconductor memory and the local semiconductor memory, said method comprising the steps of:

receiving, in a memory mapping controller coupled to the plurality of multimedia data processing units and to the system semiconductor memory and the local semiconductor memory, memory access requests from the plurality of multimedia data processing units, translating memory addresses for memory space for the plurality of multimedia data processing units to corresponding physical memory addresses in the system semiconductor memory and the local semiconductor memory according to a memory map, mapping memory access requests from the plurality of multimedia data processing units to portions of the system semiconductor memory and the local semiconductor memory, monitoring, in the memory controller, data transfer bandwidth of the system semiconductor memory and the local semiconductor memory, dynamically transferring frequently accessed data between system semiconductor memory and local semiconductor memory to reduce data transfer bandwidth of the system semiconductor memory and the local semiconductor memory, and updating the memory map to indicate new locations for transferred data, wherein the step of mapping memory access requests comprises the step of:

mapping memory access requests from the plurality of multimedia data processing units to portions of the system semiconductor memory and the local semiconductor memory according to the memory map stored in the memory map storage means.

21. A method for managing memory for a plurality of data processing multimedia data processing units coupled to the system semiconductor memory and the local semiconductor memory, said method comprising the steps of:

receiving, in a memory mapping controller coupled to the plurality of multimedia data processing units and to the system semiconductor memory and the local semiconductor memory, memory access requests from the plurality of multimedia data processing units, translating memory addresses for memory space for the plurality of multimedia data processing units to corresponding physical memory addresses in the system semiconductor memory and the local semiconductor memory according to a memory map, mapping memory access requests from the plurality of multimedia data processing units to portions of the system semiconductor memory and the local semiconductor memory, monitoring, in the memory controller, available memory capacity of the system semiconductor memory and the local semiconductor memory, dynamically transferring data between system semiconductor memory and local semiconductor memory to increase available memory capacity of one of the system semiconductor memory and the local semiconductor memory, and updating the memory map to indicate new locations for transferred data, wherein the step of mapping memory access requests comprises the step of:

mapping memory access requests from the plurality of multimedia data processing units to portions of the system semiconductor memory and the local semiconductor memory according to the memory may stored in the memory map storage means.

* * * * *